United States Patent [19]

Kronberg

[11] Patent Number: 5,039,978
[45] Date of Patent: Aug. 13, 1991

[54] ANALOG GRAPHIC DISPLAY METHOD AND APPARATUS

[76] Inventor: James W. Kronberg, P.O. Box 385, Beach Island, S.C. 29841

[21] Appl. No.: 461,964

[22] Filed: Jan. 8, 1990

[51] Int. Cl.$^5$ .................. G08B 3/00; G09G 3/20
[52] U.S. Cl. ............... 340/384 R; 340/384 E; 340/467; 340/661; 340/691; 340/870.09; 340/870.21; 340/753; 340/754; 340/767
[58] Field of Search ........... 340/384 R, 384 E, 525, 340/526, 511, 461, 466, 467, 657, 661-663, 691, 870.16, 870.09, 870.21, 870.26, 331, 332, 469, 479, 908, 908.1, 754, 767, 753

[56] References Cited

U.S. PATENT DOCUMENTS

| | | | |
|---|---|---|---|
| 3,846,749 | 11/1974 | Curry | 340/467 |
| 3,964,302 | 6/1976 | Gordon et al. | 340/462 |
| 4,083,042 | 4/1978 | Kushin et al. | 340/753 |
| 4,155,084 | 5/1979 | Klees | 340/753 |
| 4,231,013 | 10/1980 | Freeman et al. | 340/479 |
| 4,348,666 | 9/1982 | Ogita | 340/753 |
| 4,357,594 | 11/1982 | Ehrlich et al. | 340/467 |
| 4,688,029 | 8/1987 | Kawasaki et al. | 340/753 |

FOREIGN PATENT DOCUMENTS 0143667 11/1976 Japan .................. 340/753

Primary Examiner—Donnie L. Crossland
Attorney, Agent, or Firm—Harol M. Dixon; Stephen D. Hamel; William R. Moser

[57] ABSTRACT

An apparatus and method for using an output device such as an LED to show the approximate analog level of a variable electrical signal wherein a modulating AC waveform is superimposed either on the signal or a reference voltage, both of which are then fed to a comparator which drives the output device. Said device flashes at a constant perceptible rate with a duty cycle which varies in response to variations in the level of the input signal. The human eye perceives these variations in duty cycle as analogous to variations in the level of the input signal.

15 Claims, 6 Drawing Sheets

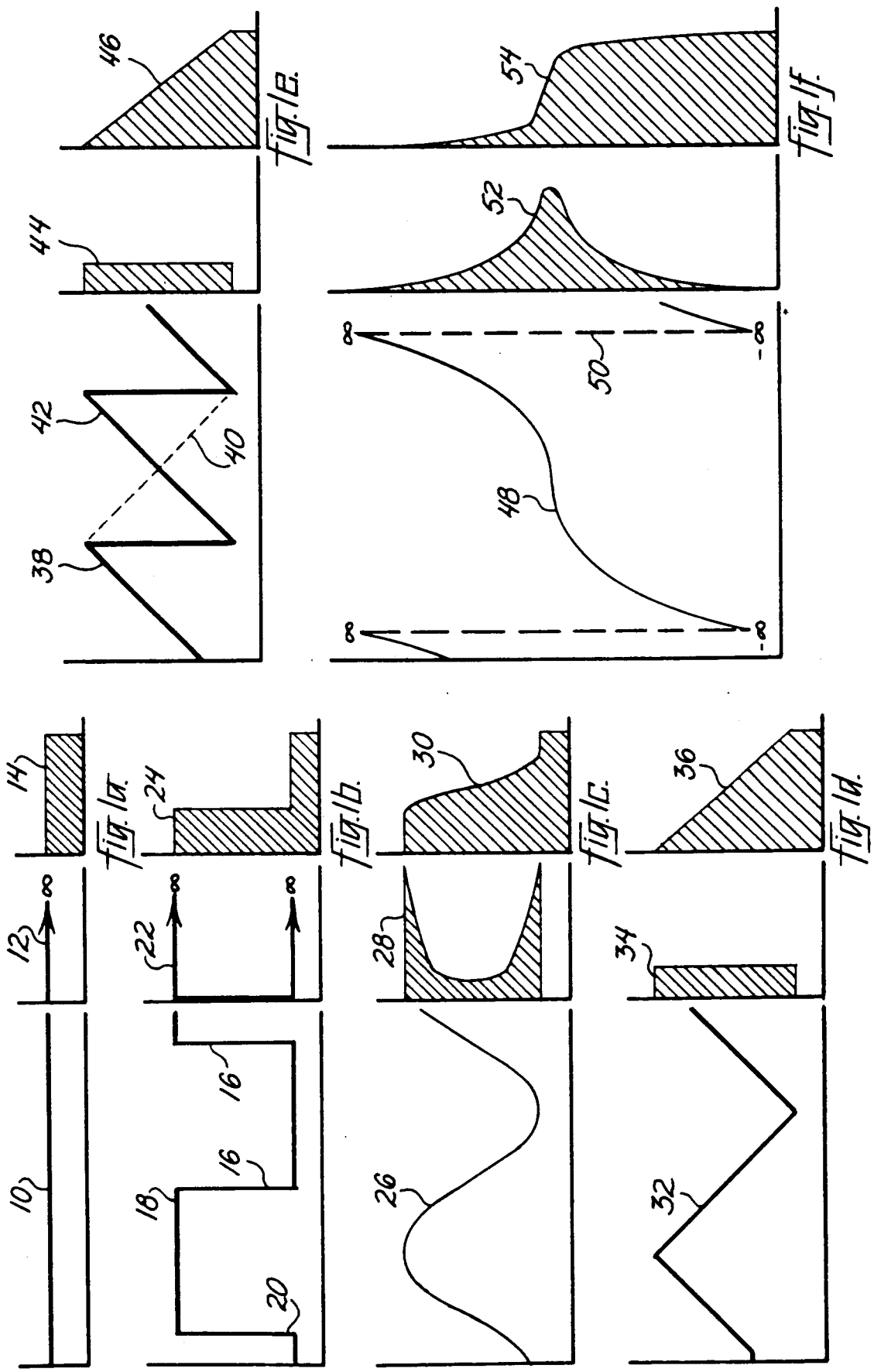

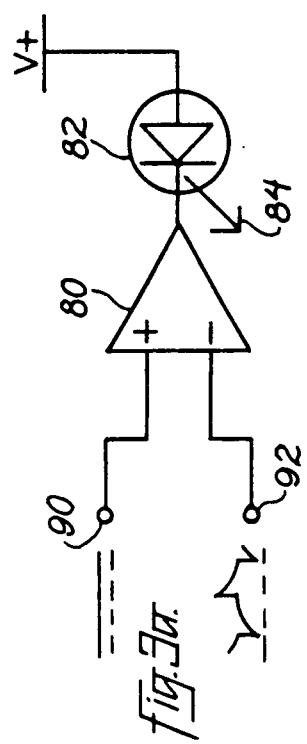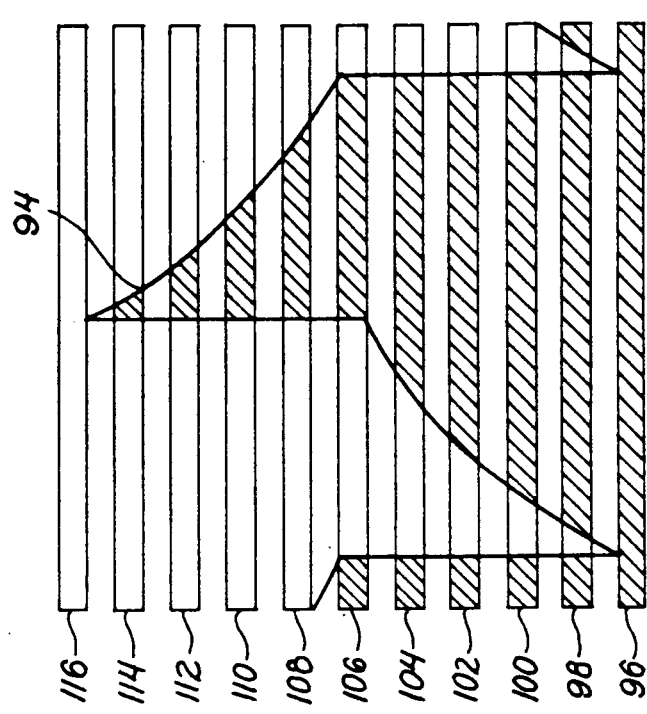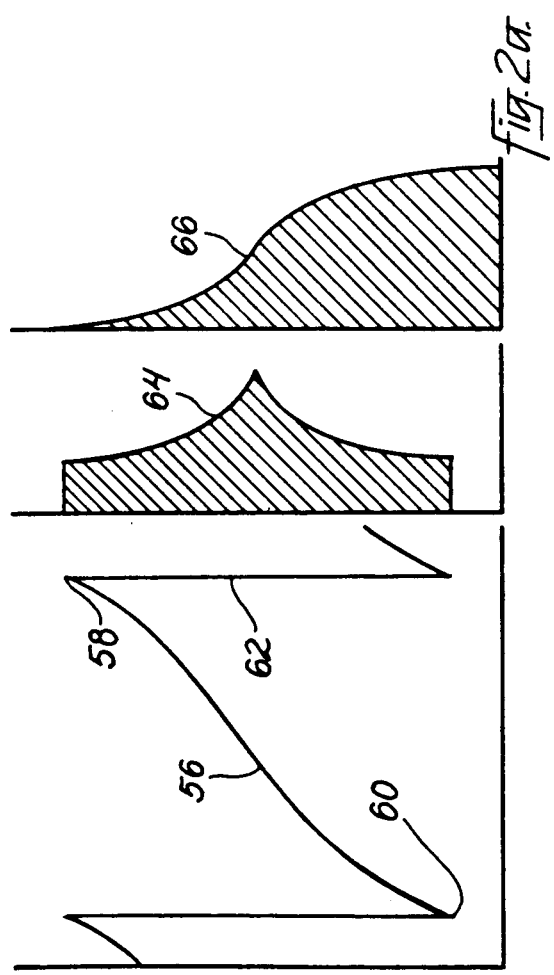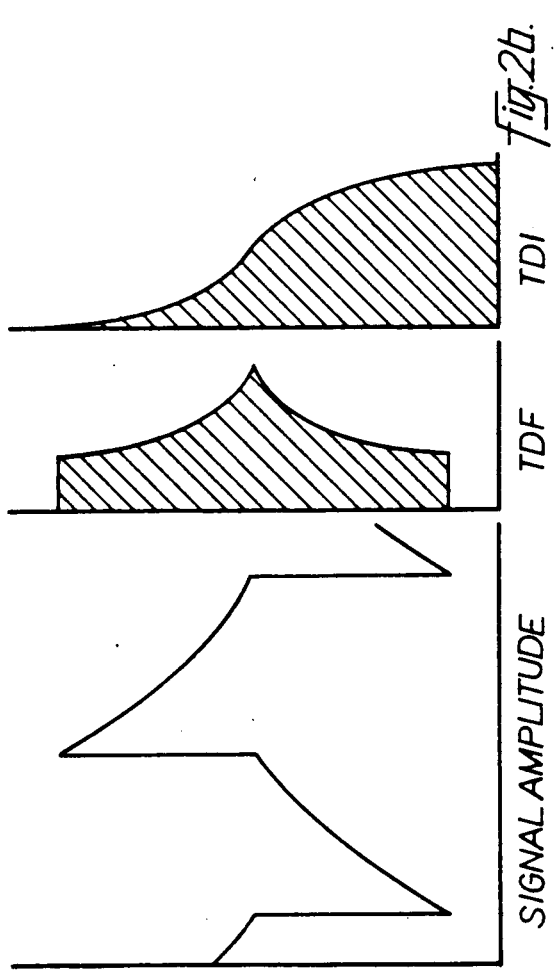

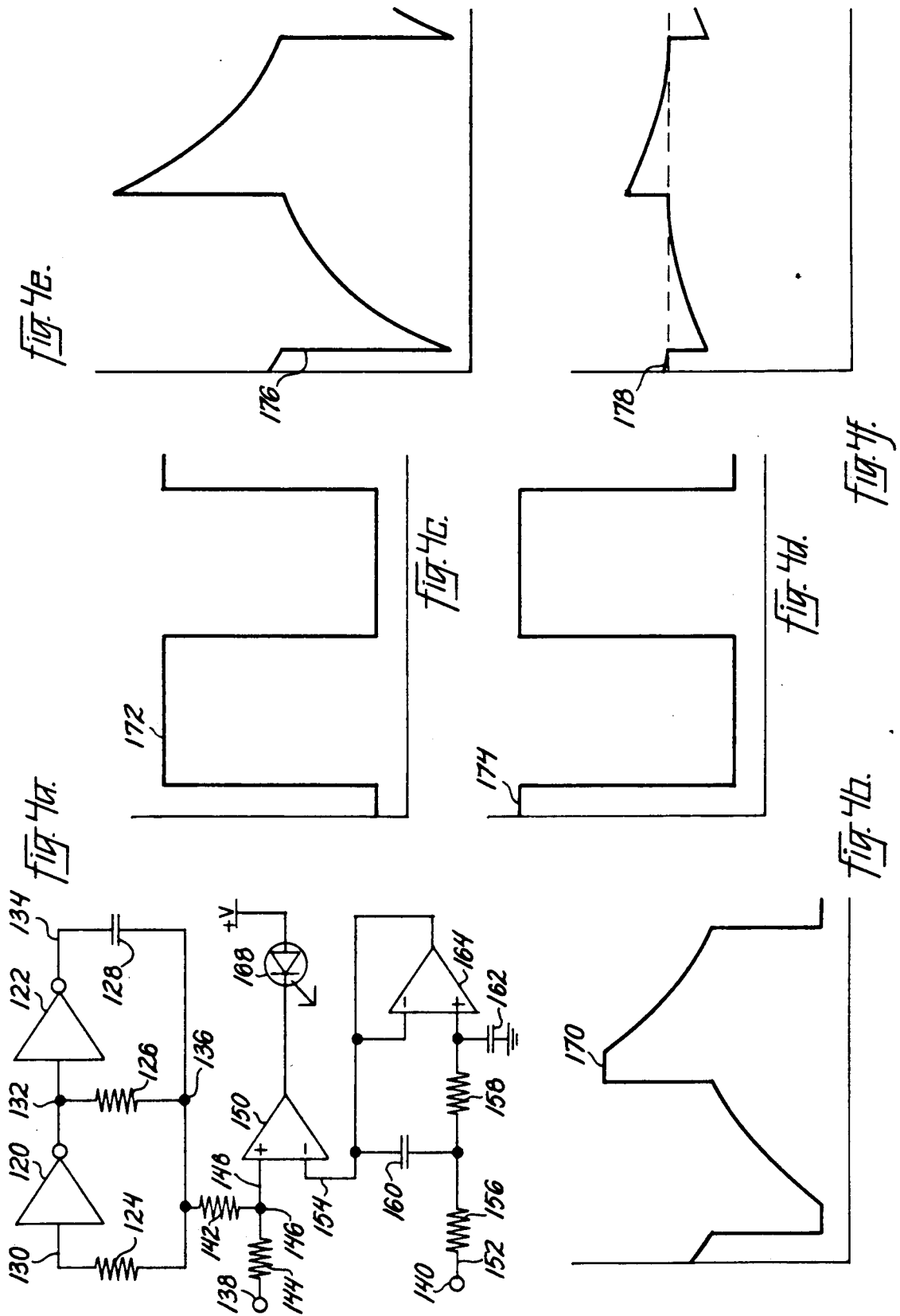

ANALOG GRAPHIC DISPLAY METHOD AND APPARATUS

The United States Government has rights in this invention pursuant to Contract No. DE-AC09-76SR00001 between the U.S. Department of Energy and E.I. DuPont de Nemours & Co.

BACKGROUND OF THE INVENTION

1. Field of the Invention and Contract Statement

This invention relates to an apparatus and method for displaying the approximate analog level of a variable electrical signal representing some physical quantity of interest.

2. Discussion of Background

Analog display devices are used extensively to indicate the levels of various physical quantities of interest, such as temperature, pressure, fuel consumption, vehicle speed, etc. The need to present this information in a limited space (for example, an automobile dashboard) often leads to a compromise between the use of relatively large, analog-type devices and smaller on-off devices. Analog devices, including moving-needle panel meters and bar-type graphic displays, have the advantage of showing where a voltage or other physical quantity lies within its operating range; simple on-off devices, sometimes called "idiot lights", require less space but can show only whether the quantity lies within or without its nominal range. For many applications, such as displaying automobile oil pressure or engine temperature, neither type of display may be wholly satisfactory: an "idiot light" may not provide sufficient information about the quantity of interest, but a larger analog display may not fit the space allotted or may not provide sufficient resolution.

Analog graphic displays are becoming increasingly popular as replacements for panel meters because they are relatively compact, easily read, have no moving parts, and provide more information than simple on-off devices. Such a display is formed by a matrix of light-emitting or light-reflecting segments, most commonly light-emitting diodes (LED's), and may take the form of a bar, circle, or fan display. An individual segment may be lighted or dark, depending upon the level of a variable input signal. In a "bar"-type display, the arrangement of light and dark segments forms a bar-like pattern whose length represents the input signal; alternatively, current is switched from one segment of the display to another in response to changes in the input, lighting (or extinguishing) one segment at a time to create the impression of a moving "dot".

Many methods exist for driving an analog graphic display, such as that typified by National Semiconductor Types 3914, 3915, and 3916 integrated-circuit display drivers where the input voltage is buffered and applied to a group of voltage comparators, each comparator fed with a different reference voltage. Depending on the relationship of the input voltage to each reference level, one or more LED's connected to the comparator outputs may be lighted. A control circuit allows either the "dot" or the "bar" mode to be effected. The reference voltages are provided by a resistor chain acting as a voltage divider. A wide variety of input signals and connection methods may be used. Different ratios between resistors in the chain provide either linear response (3914), logarithmic response (3915), or a logarithmic-like "VU" response which roughly matches that of the human ear (3916). All three versions are available either as separate DIP-packaged drivers (LM3914-6) or as preassembled graphic display modules (NSM3914-6) with built-in LED displays. Similar devices are available from many other manufacturers.

An analog graphic display has a typical resolution equal to the difference between successive reference voltages, that is, between the voltages needed to light successive LED's in the display. Application notes for the Type 3915 suggest a "smooth transition" method of improving the resolution by applying a triangle, sawtooth or sine wave in the frequency range 60 Hz–1 kHz to one end of the resistor chain; this has the effect of making each LED fade in gradually instead of turning on abruptly. Various other methods, such as an "exclamation point" display created by periodically shorting out the input signal to ground, are also suggested. Aside from these, there appear to be no commonly-accepted methods for improving the readability and resolution of these displays.

For a variable-frequency input signal, the effectiveness of the display depends on the relationship of the signal frequency to the flicker frequency, that frequency of a flashing light at which the persistence of human vision barely allows a visible flicker to be perceived. For frequencies above the flicker frequency, the light appears to glow steadily; below, it appears to flash. The flicker frequency varies with lighting conditions and from one individual to another, but is typically about 30 Hz. While the human eye can gauge the duty cycle—the relative proportion of "on" and "off" time within a single cycle—of a flashing light with reasonable accuracy, it is most sensitive when short flashes alternate with long "off" periods or when a continuous glow is broken by short interruptions. A change from 0% to 20% or from 80% to 100% "on" time is easier to detect than a change from 40% to 60%.

FIGS. 1a–f show several cyclic waveforms which might be used to modulate a signal for display on a single-element or multi-element graphic display. For purposes of discussion, these waveforms are shown in idealized form. The time distribution function of a signal, or TDF, represents the fraction of time spent by an oscillating signal at each voltage within its range. For a function $V=f(t)$ which has an inverse $t=g(V)$, TDF is a function of V equal to the sum of absolute values of the first derivative of $g(V)$, $dg(V)/dV$, at all points for which $g(V)$ exists. It is usually normalized so that its integral over one complete cycle equals one unit. TDF represents the apparent brightness distribution of graphic display elements when operating in "dot" mode and displaying the function $V=f(t)$ well above the flicker frequency.

The time distribution integral, or TDI, is a function of V defined as the integral of TDF downward from infinity to the corresponding value of V. It is defined as equal to one unit when V equals minus infinity, with values ranging from zero to one at practical values of V. It is a measure of the apparent brightness distribution of the display when operating in "bar" mode.

The Dirac delta function is a pulse of zero width, infinite amplitude, and finite area; when integrated it yields a step function proportional to this area. Appearing as an element of TDF, it represents that portion of the cycle time spent at a constant value.

TDF and TDI are shown for each waveform, drawn only approximately to scale.

FIG. 1a shows a constant input signal 10. Since the signal amplitude is the same at all times, TDF 12 is a Dirac delta function with unit area and TDI 14 shows a corresponding unit step. A single-element display driven by this signal would be the classic "idiot light", constantly on (or off) for input above some reference level and constantly off (or on) for input below the reference level, with no intermediate state. For a multi-element display in "dot" mode, this signal lights one element at a time at constant brightness, and the lighted area moves abruptly from one element to the next as the input level varies. The same is true in "bar" mode, except that several segments are lighted at the same time. A square wave (FIG. 1b) has alternating periods of constant amplitude 18 and 20, separated by sharp transitions 16. Because only two signal amplitude values are present, TDF 22 has two Dirac delta functions at corresponding levels, each with an area of one-half unit; TDI 24 shows two corresponding half-unit steps. This doubles the display resolution. For a multi-element display in "dot" mode, half-unit changes would create a display alternating between one full-brightness element and two adjacent elements either glowing at half-brightness, or, below the flicker frequency, flashing alternately with a 50% duty cycle.

FIG. 1c shows a sine wave 26. Since the signal amplitude varies continuously, TDF 28 is also continuous. Some sine-wave interference is always present in real-world signals, so every practical display has some modulation of this type. TDI 30 resembles that of a square wave, but with rounded corners. This type of modulation produces output with a duty cycle rapidly rising to about 50%, remaining near that value through a large part of its range, then rapidly increasing again to 100%. Transitions between two adjacent display elements have some degree of overlap during which both segments are lighted.

FIG. 1d shows a triangle wave 32. This gives a further increase in display resolution over the square and sine waves, as it allows small changes at intermediate values of V to have the same effect on the duty cycle as equivalent changes at high or low values. Since the signal spends an equal amount of time at each voltage, TDF 34 is flat between the two voltage extremes and TDI 36 changes steadily during a cycle.

FIG. 1e shows a sawtooth wave 38, identical with the triangle wave except for having a portion 40 time-reversed, forming portion 42. TDF 44 and TDI 46 have the same appearance as those of the triangle wave. This results from the fact that TDF and TDI are invariant with time-reversal of any part or parts of the waveform.

When an input signal is modulated at frequencies above the flicker frequency, the corresponding response with any of the above-described waveforms is partial-intensity lighting of an LED within the analog range, as in Ogita's U.S. Pat. No. 4,348,666 issued Sept. 7, 1982. For example, with square-wave modulation (FIG. 1b) the intensity is constant at 50% throughout the analog range. Other types of modulation produce varying intensities which reflect to some degree the position of the input level within its range.

To accommodate the sensitivity of human vision, changes at intermediate signal amplitudes should have larger effects on the duty cycle than those at high and low values: as noted above, small duty-cycle changes are more easily perceived near the extremes of the range than at mid-range. A disadvantage of these waveforms is that they do not match this characteristic of human vision: the sine wave favors intermediate duty cycles at the expense of high and low ones, while the triangle or sawtooth waves show no preference.

A mathematical function which does have this property is the tangent 48 (FIG. 1f). Over a half cycle, the tangent begins at minus infinity, rises with ever-decreasing slope to zero, then continues increasing to plus infinity; it then undergoes an abrupt, infinitely-fast downward transition 50 before beginning the next cycle. TDF 52 resembles a Gaussian function, with a central peak flanked by gradually-decreasing "tails"; TDI 54 resembles the Gaussian integral. However, this function cannot be realized in a practical circuit due to its infinite peak amplitude and zero transition time.

SUMMARY OF THE INVENTION

An object of the present invention is to provide an analog graphic display apparatus for displaying the approximate analog level of a variable electrical input signal.

Another object of this invention is to provide an apparatus which produces output at a constant perceptible rate with a duty cycle which varies in response to the input signal level when said signal level is within a predetermined range.

An additional object of this invention is to provide an apparatus of the type described above, in which the input signal is modulated by a cyclic waveform for display purposes.

A further object of this invention is to provide an cyclic modulating waveform which substantially accommodates the ability of the human eye to gauge on-off duty cycles at frequencies at or below the flicker frequency.

Accordingly, this invention comprises an apparatus and a method for using an output device such as an LED or audible alarm to display the level of a variable input electrical signal using a cyclic modulating waveform superimposed either on the input signal or on a reference voltage. The cyclic waveform is selected to provide a display which the human eye perceives as analogous to the input signal. Both voltages are then fed to a comparator which drives the output device. This device flashes (or produces other perceptible output) at a constant rate with a duty cycle perceived as analogous to the input signal level, which varies in response to the signal level when it is within a predetermined range.

A simple technique for generating the cyclic waveform and using it with common integrated-circuit display drivers having both linear and logarithmic responses is included.

The apparatus produces zero output when the level of the input signal of interest is below some minimum amount and constant output when the level is above some maximum amount. At intermediate levels the output varies at a perceptible rate, with a duty cycle which varies in response to changes in the input signal level. When used with a plurality of output devices, the apparatus has the additional capability of showing where the input signal level lies between these minimum and maximum values. A particularly useful feature of this invention is the cyclic modulating waveform, which accommodates the differential sensitivity of the human eye and ear to changes in the duty cycle of a variable output, such as a flashing light or audible tone generator: changes at intermediate signal levels have larger effects on the duty cycle than those at high and low values. This feature, which can be used with common types of integrated-circuit display drivers, increases the readability and information-carrying capacity of a display.

Reference is now made in detail to the present preferred embodiment of the invention, an example of which is given in the accompanying drawings.

A BRIEF DESCRIPTION OF THE DRAWINGS

The accompanying drawings, which are incorporated in and form a part of the specification, illustrate the invention and, together with the description, serve to explain the principles of the invention.

FIGS. 1a-f show the amplitude, TDF, and TDI for several cyclic waveforms which might be used for signal modulation, including constant voltage (FIG. 1a), square (FIG. 1b), sine (FIG. 1c), triangle (FIG. 1d), sawtooth (FIG. 1e), and tangent (FIG. 1f) waves.

FIGS. 2a and 2b show the amplitude, TDF, and TDI for a modified tangent waveform (FIG. 2a) and a tangentoid waveform (FIG. 2b).

FIG. 3a shows a schematic circuit with steady and tangentoid-modulated input signals. FIG. 3b shows the resulting LED-output signal.

FIG. 4a shows a circuit for generating the tangentoid waveform. FIGS. 4b-f show the voltages present at various points in the circuit.

DETAILED DESCRIPTION OF THE INVENTION

Figure 5:
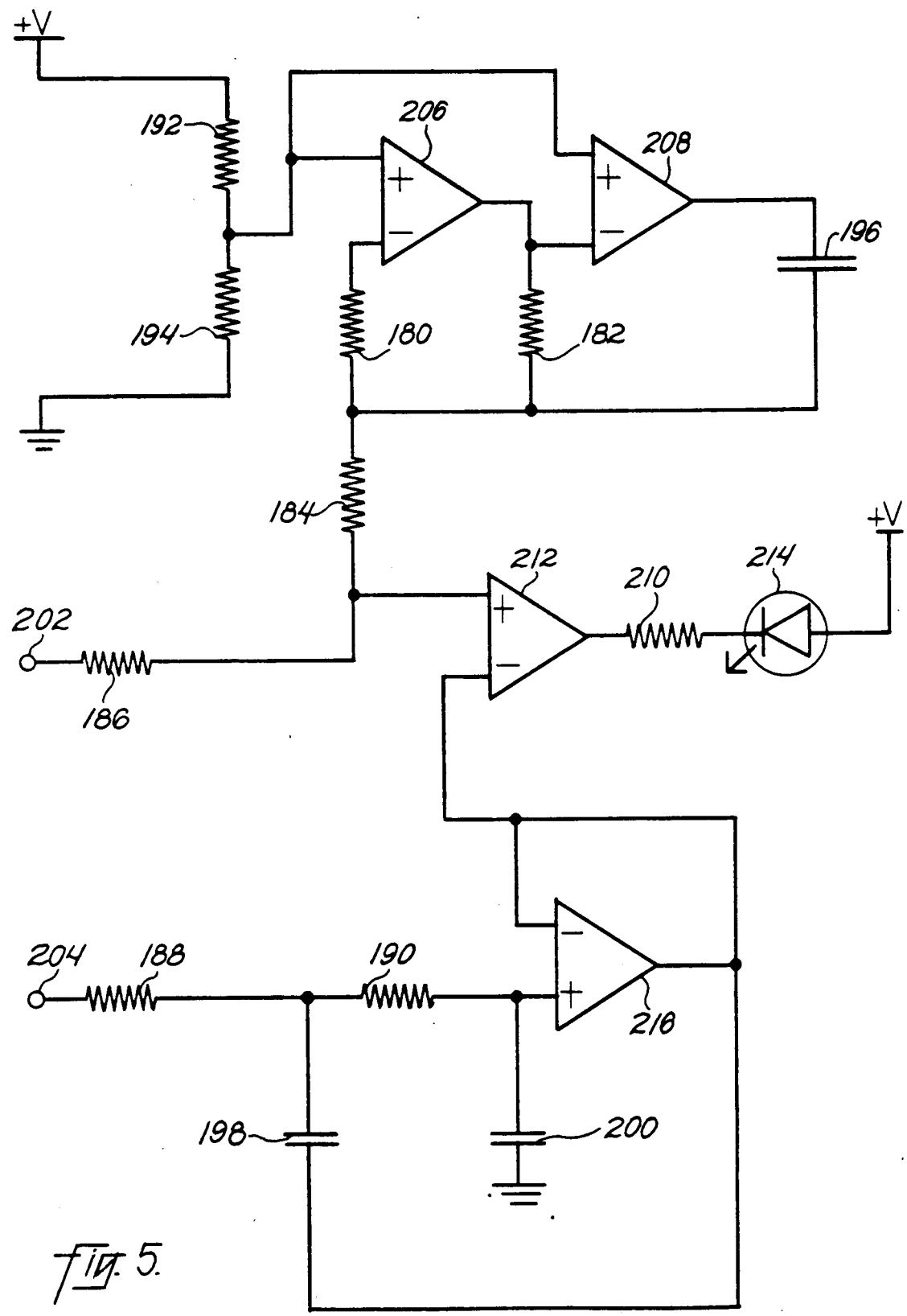
FIG. 5 shows a circuit specifically designed for monolithic construction.

As noted above, human vision is more sensitive to small changes in the duty cycle of a variable-frequency signal at the extremes of its amplitude range than at mid-range. To best accommodate this characteristic, a signal-modulating waveform for an analog display should have larger changes (for a predetermined change in input) at intermediate than at extreme level of the input signal. The tangent function (FIG. 1f) has this property, but cannot be realized in a real circuit due to its infinite peak amplitude.

FIG. 2a shows a realizable modified tangent function 56 which has many of the characteristics of the true tangent, differing in that its upper and lower limits 58 and 60, respectively, are finite and the downward transition 62 between them is less than infinitely fast. The first difference is an advantage: it means that modulated operation can be restricted to a selected range of the display, with steady on/off operation above and below this range; the second difference has little practical significance. The modified tangent function might be obtained by generating two sine waves in quadrature, then taking their ratio with a commercial four-quadrant analog multiplier circuit such as the Analog Devices AD532. However, a more cost-effective means of generating this waveform or one of similar characteristics is desirable.

TDF and TDI for the modified tangent are invariant with respect to time-reversal of the waveform segments. Breaking the function 56 (FIG. 2a) at its zero point and time reversing one of the resulting segments gives a pair of exponentially-decaying pulses of opposite polarity 68 and 70 (FIG. 2b). Since TDF 72 and TDI 74 are unchanged, this new waveform has the same relationship of output duty cycle to input signal as the modified tangent function and thus produces identical effects when used to modulate an analog graphic display signal. Because of this functional similarity, it is called a "tangentoid". It can be readily generated by relatively simple, cost-effective circuitry.

When an input signal is modulated with a modified tangent or tangentoid waveform at frequencies above the flicker frequency, the result is, for example, partial-intensity lighting of an LED within the analog range, with an intensity which reflects the position of the input level within its range. This is similar to the effect observed with the other waveforms described above.

FIG. 3a shows the input-output relationship for a simple, single-element display driven by a tangentoid waveform. Voltage comparator 80 drives output device 82, typically an LED. Arrow 84 emerging from output device 82 represents the visible or audible output signal when steady input signal 86 and tangentoid-modulated signal 88 are present at comparator inputs 90 and 92 respectively.

For purposes of this discussion, the tangentoid signal is shown as being applied to the inverting input of voltage comparator 80, although it could as readily be applied to the noninverting input. Furthermore, the modulated input is treated as being unchanging with time while the level of the steady input is variable; in practice, this relationship might be reversed, or both might be made variable. Operation is functionally similar in regard to any of these changes or combinations thereof.

FIG. 3b shows the input and output relationships for this circuit. Outline 94 represents tangentoid-modulated signal 88 applied to voltage comparator 80. Horizontal rectangular bars 96-116 represent the output 84 of device 82, with white bars representing the lighted (or sounding) state and shaded bars the dark (or silent) state; the vertical position of each bar corresponds to the relative amplitude of signal 86 compared to 88. The bars are equally spaced, each pair separated by about one-tenth the amplitude of the tangentoid signal.

When input 86 is less than the minimum amplitude 96 of the tangentoid, LED 82 is constantly "off", or dark. As input 86 is slowly increased to level 98, LED 82 appears to flash briefly once in each cycle. As input 86 increases further, the flashes widen successively (100-106) until the perceived light and dark intervals are equal in duration. At this point the duty cycle is 50%.

At frequencies below about 3 Hz, the human eye can perceive the change induration of the flashes directly. At higher frequencies, a single flash is seen as being nearly instantaneous but of varying intensity. The display is most effective in this frequency range, which centers on 10 Hz. Above the flicker frequency (about 30 Hz), the change is perceived only as a growing brightness of the LED.

As input signal amplitude increases (108-116), the duty cycle also increases. For duty cycles greater than 50%, the light is perceived as a steady glow interrupted by dark flashes, in contrast to the light flashes seen for duty cycles below 50%. These dark flashes are interpreted in a corresponding manner, with a duration perceived as intensity. The apparent intensity of the dark flashes decreases with increasing signal level until, when the input level is greater than the maximum amplitude 116 of the tangentoid, the LED is perceived as being continuously lighted.

FIG. 4a shows a circuit for generating the cyclic tangentoid waveform. This circuit is a simple astable multivibrator, or square-wave oscillator. It may be implemented in almost any digital logic technology, however, symmetrical CMOS gates, as used in the 4000-series logic chips, give the best performance at the low frequencies of interest here. A typical example is the oscillator used with the type 4541 programmable timer chip (Motorola MC1 4541, RCA CD4541, etc.). Alternatively, operational amplifiers or voltage comparators may be used in place of the logic gates; in this case, the noninverting inputs of both devices are held near the center of the output voltage range. All-operational-amplifier construction may be preferable if the driver is to be assembled in compact monolithic form. For instance, a single LM324-type, quad operational amplifier chip could be used along with various passive components; the four amplifiers on the chip would then variously act as inverters, buffers, and comparators, as required for circuit functioning.

The basic circuit, shown in FIG. 4a, consists of two inverters 120 and 122 (shown here as inverting logic gates), two resistors 124 and 126, and a capacitor 128. Resistor 124 is connected to input 130 of inverter 120; resistor 126 to the output of inverter 120 and the input of inverter 122, which are tied together at node 132. Capacitor 128 is connected to the output of inverter 122 at 134. Resistors 124 and 126, and capacitor 128 are connected at common node 136. Resistor 124 must have at least twice, and preferably several times, the resistance of 126.

For simplicity, ideal CMOS inverters are assumed in the following discussion. Ideal devices have infinite input impedance, zero-impedance outputs capable of reaching ground potential at logic "low" and the full positive supply potential at logic "high", instantaneous switching between these levels as the input voltage passes a threshold ($V_{th}$) halfway between supply and ground, and input-level clamping just above supply and just below ground. Devices such as the CD4049 approach these characteristics at low current levels. Voltage waveforms 170 (FIG. 4b), 172 (FIG. 4c), 174 (FIG. 4d), and 176 (FIG. 4e) are, respectively, the voltages present at points 130, 132, 134, and 136 in the circuit of FIG. 4a.

Assume that at the beginning of a cycle, voltage 170 (FIG. 4b) is slightly higher than $V_{th}$. Inverter 120 reads it as a logic "high" and inverts it, setting voltage 172 (FIG. 4c) at "low"; inverter 122 inverts the signal again, so voltage 174 (FIG. 4d) is "high." Since voltage 172 is at or near ground potential, current flows through resistor 126 lowering voltage 176 (FIG. 4e), which decays exponentially toward ground with a time constant determined by resistor 126, capacitor 128, and the combined impedance of resistor 124 and the input of inverter 120. In practice, this last term can usually be ignored because it is much smaller than the others.

When voltage 170 (FIG. 4b) drops to $V_{th}$, inverter 120 reads it as a logic "low" and sets voltage 172 (FIG. 4c) to "high"; inverter 122 then sets voltage 174 (FIG. 4d) to "low", and the change is transferred through capacitor 128 to node 136, driving it below ground potential. The change is coupled back to input 130 of inverter 120 through resistor 124.

With point 130 now at "low", inverters 120 and 122 remain in their new logic states until current passing through resistor 126 to the now logic "high" output of inverter 120 can draw voltage 176 (FIG. 4e) upward again exponentially towards the supply voltage, with voltage 170 (FIG. 4b) tracking it once voltage 176 is above ground. When voltage 170 reaches $V_{th}$, however, the previous sequence of transitions is repeated with the reverse polarity, driving voltage 172 (FIG. 4c) "low", 174 (FIG. 4d) "high", and 176 (FIG. 4e) above the supply potential. Voltage 176 then decays exponentially toward ground until it reaches $V_{th}$, when a new sequence of transitions takes place and voltage 176 is driven below ground again.

For the component values given below, the resulting waveform has a frequency close to the optimum 10 Hz.

The alternating positive and negative transitions generate square waves 172 (FIG. 4c) and 174 (FIG. 4d) at the outputs of inverters 120 and 122; no direct use is made of these in the present invention. Instead, the tangentoid signal is output across resistor 142 connected to node 136; resistor 142 has ten or more times the resistance of resistor 126, so that a small current can be drawn off through it without disrupting oscillation. Resistor 144, with resistance comparable to resistor 142, is connected to it, forming a voltage divider and attenuator whose opposite end 138 may be connected to any steady or variable voltage source which is within the supply range of inverters 120 and 122.

By a suitable choice of input and the ratio of resistors 142 and 144, tangentoid waveform 178 (FIG. 4f) may be produced at junction 146 (FIG. 4a) of resistors 142 and 144, having any desired peak amplitude and average value within the supply range. Waveform 178 is connected to one input 148 of voltage comparator 150, while a second signal 152 is applied through terminal 140, with or without intervening filtering or other processing, to the other input 154 of 150.

Either signal 138 or signal 152 may be used as the input for display 168; the other is be fixed by a voltage divider or other source of constant voltage, but may, if needed, also be variable. The input signal is preferably stabilized by low-pass filtering, for example, by connecting an active low-pass filter (preferably with a cutoff frequency between 1 HZ and 10 Hz) consisting of resistors 156 and 158, capacitors 160 and 162, and operational amplifier 164 between terminal 140 and input 154 of voltage comparator 150.

FIG. 5 shows a circuit intended for monolithic construction, using an LM324-type, quad operational amplifier chip whose four amplifiers 206, 208, 212, and 216 perform all the needed circuit functions. Fabrication could be by virtually any standard method, including the following: conventional through-hole or surfacemount printed-circuit methods; thick-film technology, with resistors and capacitors mounted on a ceramic substrate along with the 324 chip; all-silicon technology, with most or all parts shown fabricated on a single silicon chip; or any combination of these and other methods. External connection of resistors 186 and 210, and capacitors 196, 198, and 200, would provide added design flexibility.

Resistors 180, 182, 184, 186, 188, 190; and capacitors 196, 198, and 200 function as do the corresponding components (resistors 124, 126, 142, 144, 156, and 158; capacitors 128, 160, and 162) in the circuit of FIG. 4. Points 202 and 204 correspond to the points 138 and 140, respectively, of the circuit of FIG. 4. Operational amplifiers are used in all circuit functions so that all active components may be of the same type, thus simplifying fabrication. The voltage divider formed by resistors 192 and 194 supplies the noninverting inputs of amplifiers 206 and 208 with a voltage midway between their positive and negative output limits. Resistor 210 protects driver 212 and output device 214 by limiting current flow through them.

Output device 214 may be separate from the monolithic circuit, or, alternatively, the two may be combined in a single assembly. While a light-emitting diode is shown here, output device 214 can be virtually any fast-responding luminescent or variably-reflective optical device, a sound generator such as a Malory Sonalert, or—if higher power is desired—the low-current side of an optically-isolated, AC or DC solid-state relay.

If printed-circuit or thick-film fabrication technology is used, capacitors 196, 198, and 200 may be part of the monolithic assembly. Because of the difficulty of fabricating large silicon capacitors, these components may have to be mounted externally to an all-silicon assembly. Resistor 186 is preferably a discrete, external resistor through which the user may program different range widths by varying the amplitude of the tangentoid signal input to amplifier 206. Resistor 210 is also preferably external, chosen according to the nature of output device 214. All other components shown are preferably parts of the monolithic assembly, regardless of fabrication technology.

Preferred values for the passive components shown are:
Resistors 180, 184, 192: 1,000,000 ohms
Resistors 182, 188, 190: 220,000 ohms
Resistor 186: user-selected; typically 100,000–1,000,000 ohms
Resistor 194: 820,000 ohms
Resistor 210: user-selected; typically 1000 ohms for LED output
Capacitors 196, 200: 0.1 microfarads
Capacitor 198: 0.22 microfarads This circuit will operate from DC supply voltages ranging from six to eighteen volts, and is thus suitable for most industrial and automotive applications.

Figure 6B:
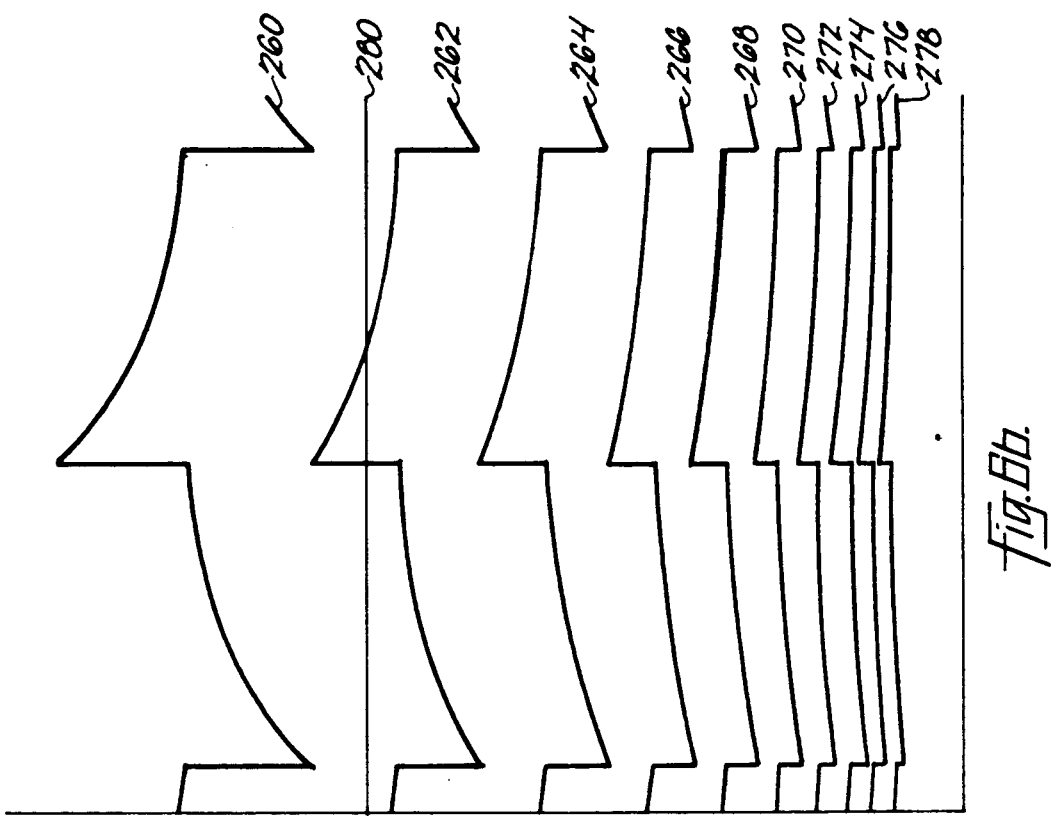
FIGS. 6a and 6b show an application of the technique of FIG. 4 to modulate a display with logarithmic response.
Figure 6A:
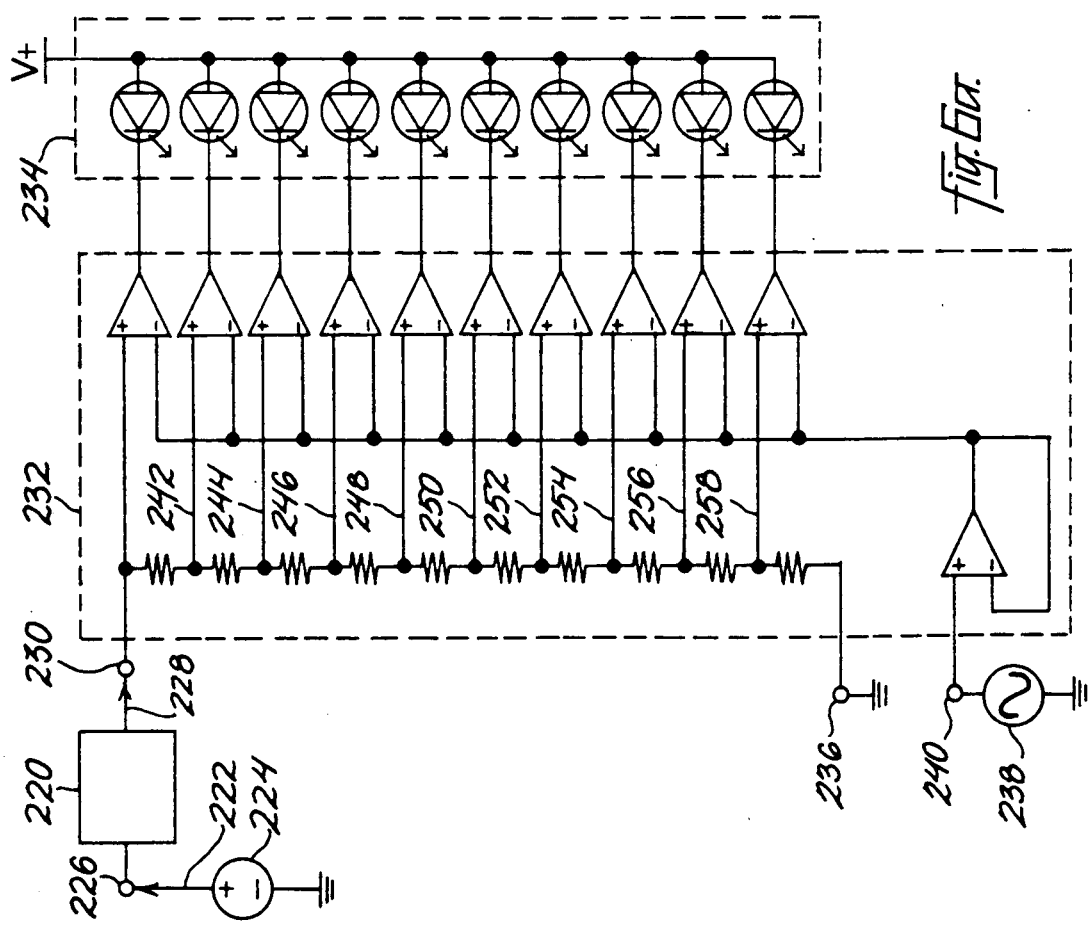

FIG. 6a shows an application of the technique of FIG. 4a to drive a logarithmic-scale graphic display. This is an LM3915 module, adapted for use with tangentoid modulation below the flicker frequency.

Block 220 contains the circuit of FIG. 4a as described above. DC signal 222 from source 224 (for example, a potentiometer connected between supply and ground) is connected to input 226. The circuit components are chosen so the cyclic waveform produced at output 228 has a positive peak value near the positive supply potential, and a ratio between positive and negative peak values roughly equal to one logarithmic display step.

Output 228 is connected to upper voltage divider input 230 of display driver 232, driving display 234 (which may have a single element instead of the multiple elements shown here). For convenience in the following discussion, display driver 232 is assumed to be an LM3915 or equivalent. Lower voltage divider input 236 of driver 232 is grounded. As a result, voltage 260 (FIG. 6b) is divided to produce nine additional waveforms 262–278, spaced one logarithmic step apart so that the positive peak of each corresponds to the negative peak of the next higher one. These waveforms are fed as reference levels to comparators (and corresponding display segments) 242–258.

Variable signal source 238 (FIG. 6a), representing the quantity to be displayed by the graphic display, is connected to signal input 240 of display driver 232, applying signal 280 (FIG. 6b) to the internal voltage comparators. An example of the relationship of signal 240 to the reference levels 260 and 262–278 is shown in FIG. 6b. With the display in "bar" mode and an input slightly above the midway point of the corresponding bar division, segments 246–258 (FIG. 6a) are lighted steadily, top segment 242 is dark, and segment 244 is flashing with a duty cycle of about 80%.

Figure 7B:
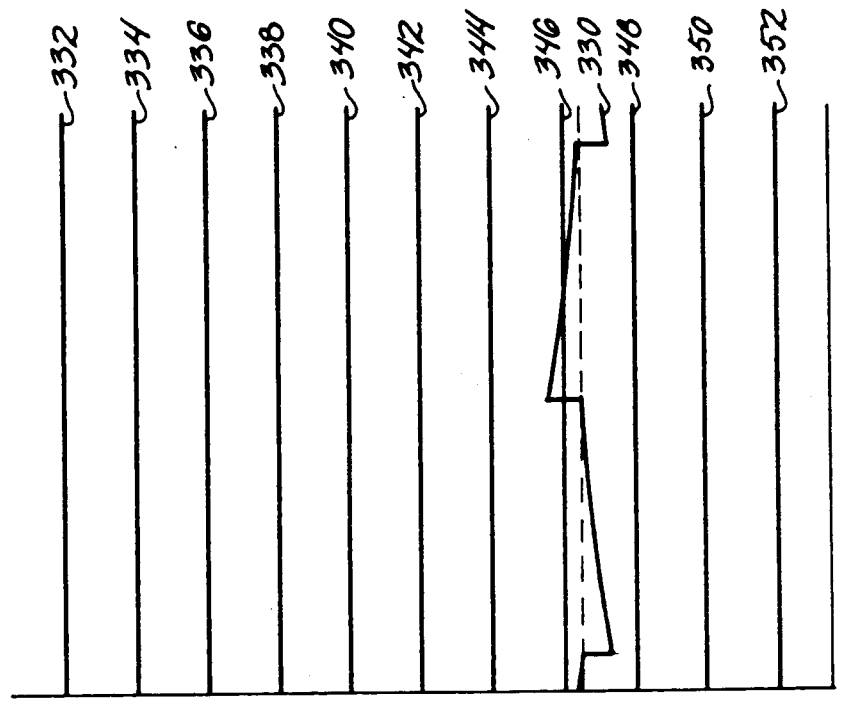
FIGS. 7a and 7b show a circuit for modulating a display with linear response.
Figure 7A:
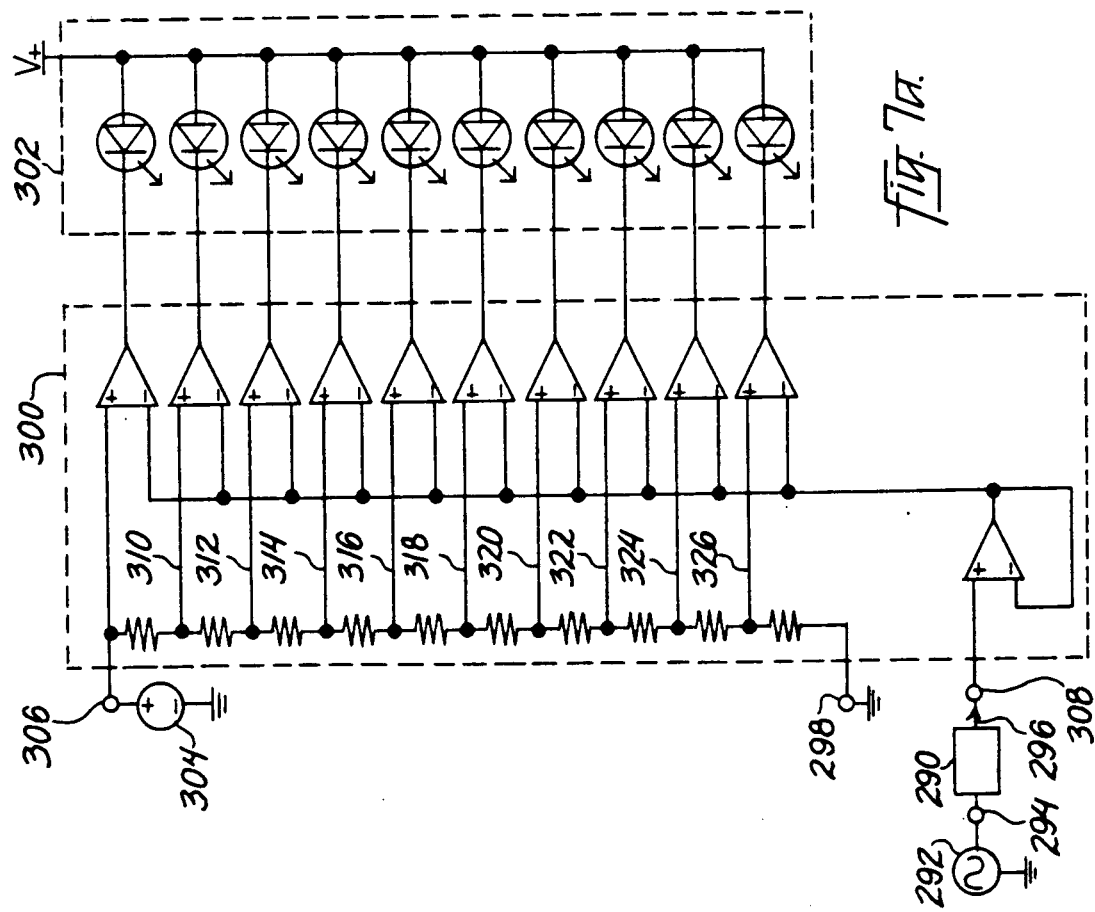

FIG. 7a shows a circuit for modulating a display with linear response. Block 290 represents the circuit of FIG. 4 with variable input signal 292 applied to input 294. The internal circuit components are chosen so that the peak-to-peak amplitude of the tangentoid waveform roughly equals one graphic display division. Buffered output 296 is connected to signal input 308 of display driver 300, driving display 302, rather than to the divider chain as in the preceding discussion. Variable voltage source 304 is connected to upper terminal 306 of the resistor chain; lower end 298 is grounded, and output 332 (FIG. 7b) of source 304 is set equal to the maximum value of the buffered and modulated signal at terminal 308 (FIG. 7a).

Voltage 332 (FIG. 7b) produces nine additional equally-spaced reference levels 334–352. These are fed to comparators (and corresponding display inputs) 310–326. An example of the relationship of reference levels 334–252 to modulated and buffered input signal 330 is shown in FIG. 7b. With the display in "bar" mode and a signal level near the bottom of the corresponding bar division, segments 324 and 326 (FIG. 7a) are lighted steadily, and segment 322 is flashing with a duty cycle of about 10%.

The circuit shown in FIG. 7a may also be used to modulate a modified logarithmic display. In this case the reference levels are spaced irregularly to represent specified decibel levels, but (at least in the LM3916) are still reasonably close to those of the linear display.

It will be evident to those skilled in the art that many other arrangements for driving a display using this method and apparatus are possible. For example, a multi-element display may be driven in "bar" mode with all lighted segments flashing with a duty cycle which represents the input signal level, or in "dot" mode with only one element activated at a time.

The foregoing description of preferred embodiments of the invention has been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. An apparatus for displaying an analog of an input electrical signal, said apparatus comprising:
    first circuit means for generating a cyclic electrical signal with positive and negative peak values and intermediate values,
    said cyclic electrical signal having rapidly varying amplitude near said positive and said negative peak values and slowly varying amplitude at said intermediate values;
    output means having a duty cycle; and second circuit means for comparing said input signal with said cyclic signal and generating an output signal, for driving said output means with said output signal, and for varying said duty cycle in response to variations in the amplitude of said input signal.

2. The apparatus of claim 1, wherein said cyclic electrical signal further comprises a tangentoid waveform.

3. The apparatus of claim 2, wherein the frequency of said cyclic electrical signal is from approximately 3 Hz to approximately 30 Hz.

4. The apparatus of claim 2, wherein said output means comprises an audible tone generator, a light emitting diode, or a liquid crystal display.

5. The apparatus of claim 2, wherein said first circuit means is an astable multivibrator.

6. The apparatus of claim 1, wherein the frequency of said cyclic electrical signal is from approximately 3 Hz to approximately 30 Hz.

7. The apparatus of claim 6, wherein said output means comprises an audible tone generator, a light emitting diode, or a liquid crystal display.

8. The apparatus of claim 6, wherein said first circuit means is an astable multivibrator.

9. The apparatus of claim 1, wherein said output means comprises an audible tone generator, a light emitting diode, or a liquid crystal display.

10. The apparatus of claim 9, wherein said first circuit means is an astable multivibrator.

11. The apparatus of claim 1, wherein said first circuit means is an astable multivibrator.

12. A method for displaying an analog of an input electrical signal comprising the steps of:
   generating a cyclical waveform having rapidly varying amplitude near the positive and negative peak values of a cycle and slowly varying amplitude at intermediate values of a cycle;
   comparing said input signal with said cyclical waveform and generating an output signal;
   driving an output means having a duty cycle with said output signal; and
   varying said duty cycle in response to variations in the amplitude of said input signal.

13. The method of claim 12, wherein said output means comprises an audible tone generator, a light emitting diode, or a liquid crystal display.

14. A method for displaying an analog of an input electrical signal comprising the steps of:
   generating a tangentoidal waveform;
   comparing said input signal with said tangentoidal waveform and generating an output signal;
   driving an output means having a duty cycle with said output signal; and
   varying said duty cycle in response to variations in the amplitude of said input signal.

15. The method of claim 14, wherein said output means comprises an audible tone generator, a light emitting diode, or a liquid crystal display.

* * * * *